United States Patent
Tsune

[19]

[11] Patent Number: 5,878,641
[45] Date of Patent: Mar. 9, 1999

[54] CUTTING APPARATUS

[75] Inventor: Ryoichi Tsune, Toyama, Japan

[73] Assignee: Tsune Seiki Co., Ltd., Japan

[21] Appl. No.: 890,947

[22] Filed: Jul. 10, 1997

[30] Foreign Application Priority Data

Jul. 12, 1996 [JP] Japan .................................. 8-183427

[51] Int. Cl.⁶ ................................................. B26D 5/20
[52] U.S. Cl. ................................. 83/277; 83/54; 83/280; 83/409; 83/417; 83/436.3
[58] Field of Search ............................. 83/54, 277, 280, 83/409, 417, 436.3

[56] References Cited

U.S. PATENT DOCUMENTS

| | | |
|---|---|---|
| 3,244,047 | 4/1966 | Daniluk . |
| 3,466,958 | 9/1969 | Munson . |
| 4,524,656 | 6/1985 | Del Fabro et al. ......................... 83/23 |
| 4,778,044 | 10/1988 | Kondo .................................. 198/464.2 |
| 5,088,364 | 2/1992 | Stolzer ....................................... 83/43 |
| 5,406,870 | 4/1995 | Suitts et al. ................................ 83/23 |
| 5,479,839 | 1/1996 | Johansson ................................... 83/23 |

*Primary Examiner*—Peter Vo
*Assistant Examiner*—Kevin G. Vereene
*Attorney, Agent, or Firm*—Schweitzer Cornman Gross & Bondell LLP

[57] ABSTRACT

A cutting machine for cutting elongated workpieces, having a work loading mechanism with a number of inclined, parallel supporting rails for supporting a plurality of elongated workpieces each having a longitudinal axis, the workpieces standing by on the supporting rails parallel to each other and with their longitudinal axes perpendicularly to said supporting rails, said supporting rails each inclining toward a work conveying path for longitudinally carrying workpieces seriatim toward the front end of the work conveying path to a cutting position, a work carrying reciprocating drive including a vise, a carriage and a drive motor for reciprocating along the work conveying path to move the workpieces toward the front end of the work carrying path, the supporting rail closest to the front of the work carrying path being disposed within the range of said reciprocation.

6 Claims, 4 Drawing Sheets

(A)

(B)

CUTTING APPARATUS

FIELD OF THE INVENTION

The present invention relates to cutting apparatus for feeding a round bar, a tube, or another type of elongated workpiece to a conveying path loading mechanism, for carrying the workpiece to a cutting position by carrying vise, and for cutting the workpiece into parts of predetermined lengths by a saw.

BACKGROUND

A plan view of a conventional cutting machine is shown in FIG. 4, which includes a workpiece loading mechanism 1. The loading mechanism 1 includes inclined supporting rails 2a and 2b for horizontally holding in parallel elongated workpieces W perpendicularly to the rails. A horizontal work conveying path 3 is formed at the lower ends of the slanting support rails 2a and 2b. The workpieces W can be fed on the supporting rails 2a and 2b one by one to the horizontal conveying path 3. The support rails 2a and 2b extend perpendicularly outward and upward at a relatively gentle angle from the horizontal conveying path 3. The front support rail 2a has a positioning guide 4 for contact with the front ends of the workpieces W to position the pieces. Horizontal rollers 5 are provided in the conveying path 3 for supporting a workpiece W in a longitudinally movable manner. A work carrying vise 6 can hold a workpiece W arriving from the conveying path 3, and carry it to the cutting position P. Ordinarily, the vise 6 reciprocates between the ends of the workpath stroke S which is the length of a cut workpiece W. The vise 6 has a pair of guide rods 7, a carriage 8 supported on the rods 7 to reciprocate along them, and a hydraulic cylinder (not shown) for driving the carriage 8. Mounted on the carriage 8 are a fixed vise jaw 9a, a movable vise jaw 9b, and a hydraulic cylinder 10 for actuating the vise 9b.

The inclined positioning support rail 2a at the front of the loading mechanism 1 is located rearward from the rear end of the path of the movement L of the work carrying vise 6. The front end of the conveying path 3 is located rearward from the range L. The carriage 8 of the vise 6 is driven by the hydraulic cylinder (not shown). When a workpiece W is cut into pieces of the predetermined length, the carriage 8 reciprocates between the forward and rearward movement limiting positions of the stroke S as determined by stoppers (not shown). When changing the cutting length the position of the rear stopper is adjusted for setting the rearward movement limiting position of the carriage.

After cutting a workpiece W a next workpiece is transferred by work transfer apparatus (not shown) from the conveying path 3 onto the work carrying vise 6 at its rear limiting position shown by solid lines in FIG. 4. This lowers the working efficiency of the apparatus, and requires an additional mechanism. In that case, even if the carriage 8 is moved to the rear end of its range of movement L, a workpiece W cannot be fed onto the vise 6 by the loading mechanism 1, because the front end of the conveying path 3 is located rearward from the range L. In addition, it is very laborious and troublesome to change the position of the stopper.

SUMMARY OF THE INVENTION

It is a main object of the present invention to provide a cutting apparatus which can feed a workpiece W directly to a predetermined position in the carrying vise by the loading mechanism.

Cutting apparatus according to the invention comprises a work loading mechanism, a work conveying path and a work carrying vise mechanism. The loading mechanism includes a positioning inclined support rail adjacent to its front end. The rail is located within the range of movement of the vise mechanism so that the conveying path overlaps with the range. The vise mechanism includes a carriage which can be moved by a drive means actuated by an electric motor. When a workpiece is loaded into the conveying path by the loading mechanism, its front end portion is placed automatically on the vise mechanism, where it can be held. It is therefore not necessary to transfer the piece in the conveying path onto the vise mechanism by means of such special transfer equipment as has been required conventionally. This improves the working efficiency, and makes the extra equipment unnecessary, lowering the costs. By making the carriage of the vise mechanism movable by means of the drive means actuated by the electric motor, it is easy to arbitrarily set the stroke, the stop position and/or the like of the carriage.

DESCRIPTION OF THE DRAWING

The present invention is explained in greater detail with reference being had to the accompanying drawing, wherein.

DETAILED DESCRIPTION

Figure 1:
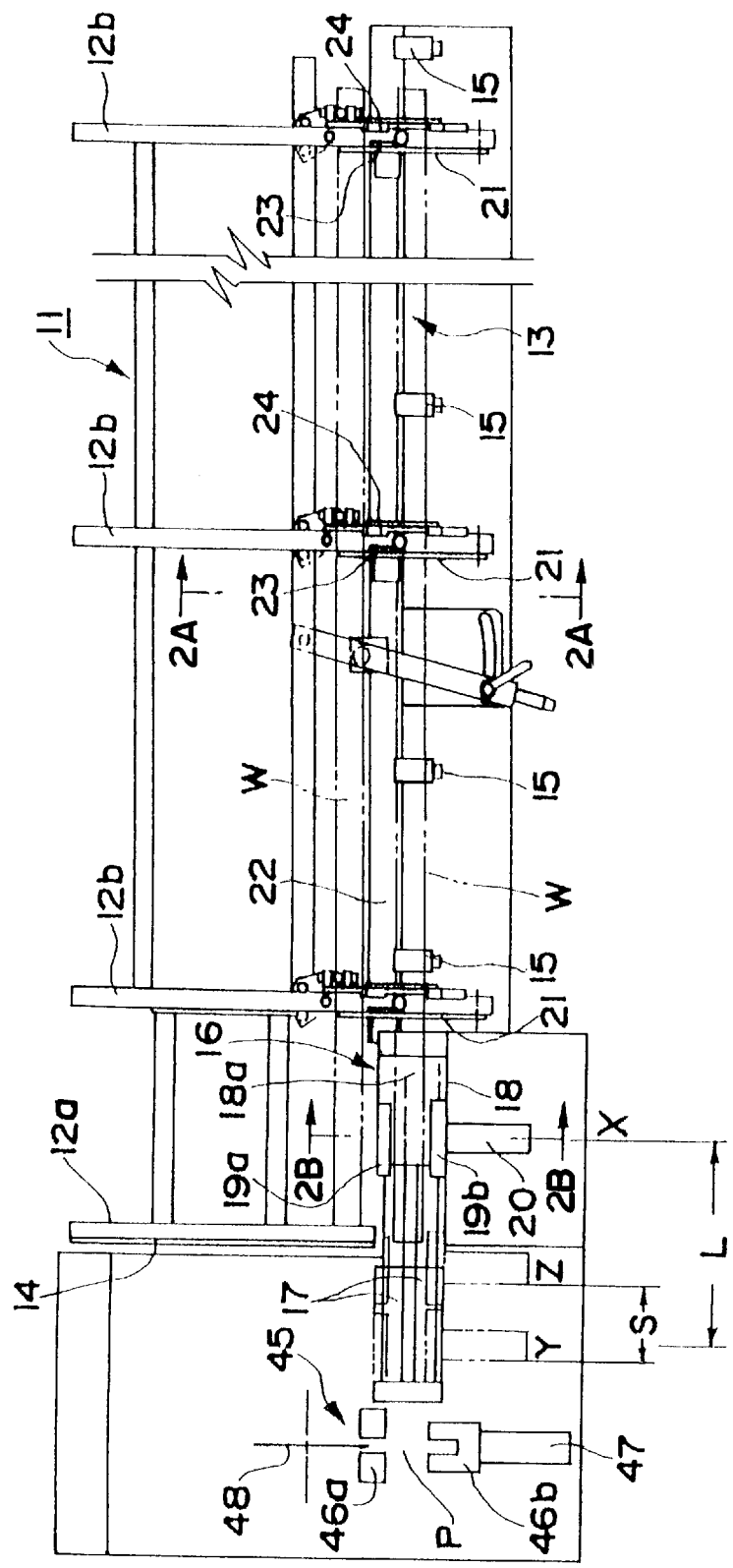
FIG. 1 is a top plan view of cutting apparatus according to the invention.

The cutting apparatus shown in FIG. 1 has a loading mechanism 11 that has inclined supporting rails 12a and 12b. Elongated workpieces W can be positioned horizontally, parallel with each other and perpendicularly to the supporting rails 12a and 12b. The loading mechanism 11 has a horizontal work conveying path 13 at the lower ends of the inclined supporting rails 12a and 12b. The workpieces W on the supporting rails 12a and 12b can be fed one by one to the conveying path 13. A work carrying vise 16 can move horizontally between the rear end X and front end Y of a range L of movement as shown in FIG. 1. This movement carries a workpiece W along the conveying path 13 to the cutting position P. Ordinarily, the vise 16 moves between the end positions Y and Z of the stroke S that is equal to the cut lengths of the workpiece W. The vise 16 includes a carriage 18 supported on a pair of horizontal parallel guide rods 17. The carriage 18 can be reciprocated along the guide rods 17 by a drive actuated by an electric motor. The carriage 18 has a work supporting surface 18a, and a fixed vise jaw 19a and a movable vise jaw 19b are mounted on that surface. The movable vise jaw 19b can be actuated by a hydraulic cylinder 20.

The inclined support rail 12a at the front end of the loading mechanism has a positioning role and has a positioning guide 14 for contacting the front ends of workpieces W to position the pieces. As shown in FIG. 1, the positioning support rail 12a is located midway within the range L of movement of the carrying vise 16. Consequently, the front end of the conveying path 13 along the lower ends of the supporting rails 12a and 12b extends to the middle of the range L. Horizontal rollers 15 and work transferors 21 are disposed at suitable intervals along the length of the conveying path 13 except in the range L of movement of the carrying vise 16. The rollers 15 are rotatably supported on a frame 22, which extends along the conveying path 13. The frame is rectangular with a lateral open side. The inclined supporting rails 12a and 12b extend perpendicularly to and outward from the conveying path 13, and upward at a gentle angle between about 5 and 10 degrees. The supporting rails 12a and 12b each include a fixed stopper 23 and a movable stopper 24 on their lower sides.

Figure 2:
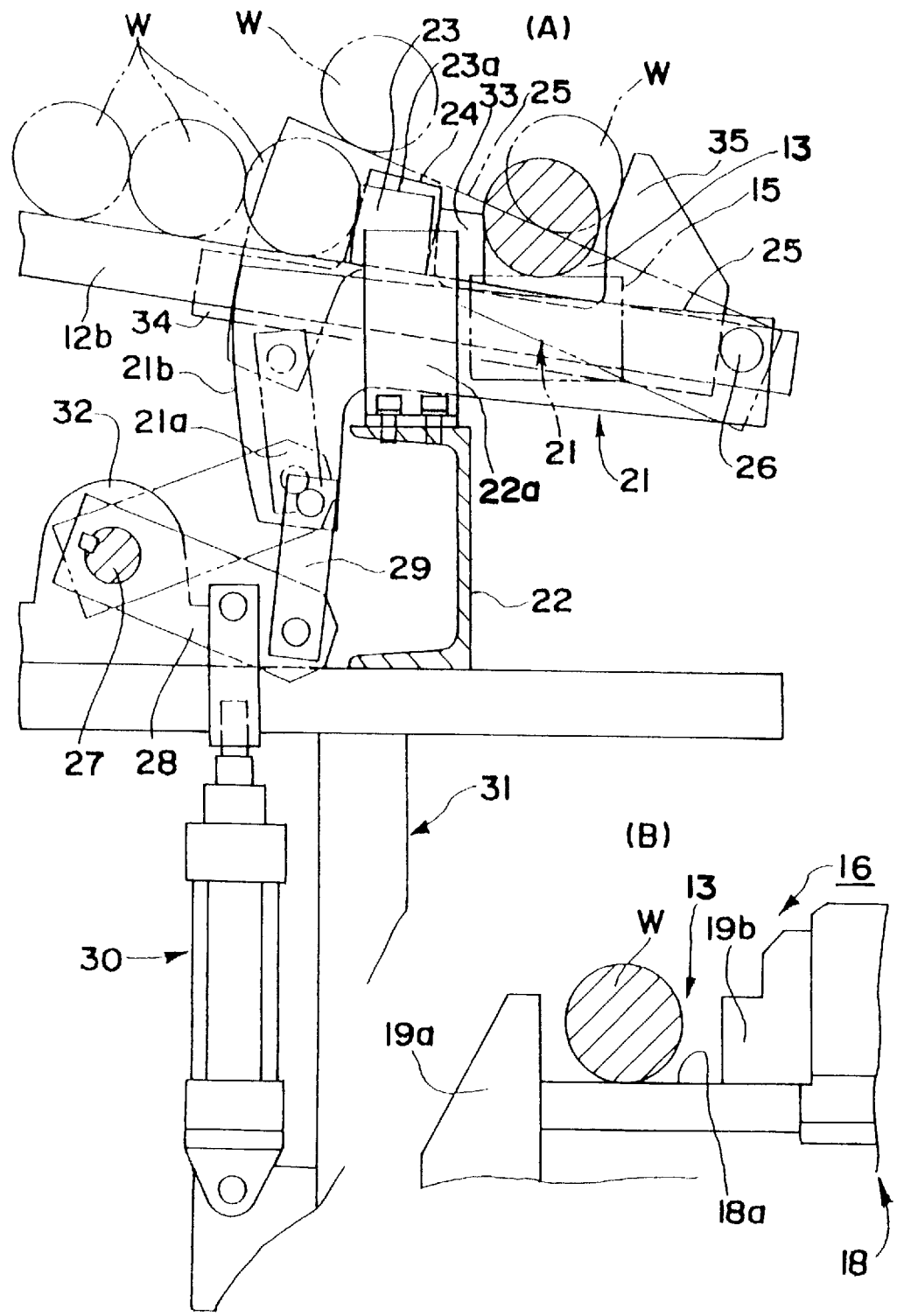
FIG. 2(A) is an enlarged cross-sectional view taken along line M—M of FIG. 1.
FIG. 2(B) is an enlarged cross-sectional view taken along line N—N of FIG. 1.

As shown in FIGS. 1 and 2(A), each work transferor 21 extends along the front surface of one of the inclined supporting rails 12b across the work conveying path 13. The work transferor 21 is an L-shaped inclined plate, and has an inclined supporting top surfaces 25. As shown in FIG. 2(A), the transferor 21 is pivotably supported at its lower end about a horizontal pin 26 on the lower end of a side of the associated supporting rail 12b. The transferor 21 has an integral arm 21a extending downwardly from its free end. The arm 21a is connected through a link 29 to an end of an arm 28. The arms 28 for all work transferor 21 are affixed to a horizontal shaft 27. Only one of the arms 28 is connected to a hydraulic cylinder 30 for driving the arm. As shown in FIG. 2(A), the upper end 21b of each work transferor 21 has a circular or arcuate surface.

When the hydraulic cylinder 30 is retracted as shown by solid lines in FIG. 2(A), the inclined supporting top surfaces 25 of the transferor 21 are positioned a slightly below the top surfaces for the inclined supporting rails 12b. When the hydraulic cylinder 30 extends by a predetermined stroke, the transferors 21 pivot vertically (perpendicularly to workpieces W supported on the rails 12b) to their upper position shown by two-dot broken lines in FIG. 2(A). Thus, the telescoping motion of the hydraulic cylinder 30 swings the transferors 21 between their retracted lower and extended upper positions. As also seen in FIG. 2(A), the entirety of the top surfaces 25 of the transferors 21 at their retracted lower position are located below the tops of the horizontal rolls 15.

The horizontal shaft 27 is supported by bearings 32 on a machine frame 31, and connected through the arms 28 and links 29 to the transferors 21. Therefore, the actuation of the single hydraulic cylinder 30 turns the shaft 27 through the arm 28 connected to the cylinder 30 by the required angle. The turn of the shaft 27 in both directions swings all transferors 21 up and down as described above. As shown in FIG. 2(A), the horizontal frame 22 supports vertical guide plates 22a bolted to it. Each guide plate 22a faces the front side surface of one of the inclined supporting rails 12b, and cooperates with it to guide the vertical swing of the associated transferor 21 between them.

As shown in FIG. 2(A), each fixed stopper 23 is a rectangular plate that protrudes upwardly from the associated supporting rail 12b on the side of the conveying path 13 which is adjacent to the upper end of the rail 12b. The top surfaces 23a of the fixes stoppers 23 are positioned somewhat below the inclined top surfaces 25 of the transferors 21 at their upper limiting position. The top surfaces 23a are generally inclined in the same direction as the inclination of the top surfaces 25. A conical roller 33 is supported on the top of each supporting rail 12b, as fixed positioner for setting a reference position for positioning a workpiece W. This conical roller 33 is located on the side of the associated stopper 23 which is adjacent to the conveying path 13.

As shown in FIGS. 1 and 2(A), each movable stopper 24 is part of a long plate 34 which is supported on the rear of one of the inclined supporting rails 12b so that it can be slidably adjusted along the associated rail 12b. This plate 34 is inclined in the same direction as the inclination of the rail 12b. The movable stopper 24 protrudes upwardly and integrally from the middle of the length of the plate 34. A movable positioner 35 protrudes upward and integrally from the lower end of the plate 34, the positioner having a peaking top portion.

In use of the loading mechanism 11, the long plates 34 are set at predetermined positions, as shown in FIG. 2(A), for the diameter of particular workpieces W. In this position the distance between each movable positioner 35 and the associated fixed conical roller 33 in the direction across the conveying path 13 is slightly larger than the workpiece diameter. Workpieces W are placed in order on the top sides or the inclined supporting rails 12a and 12b in parallel with the conveying path 13 and, as shown in FIG. 2(A), roll on them under the effect of gravity. The first piece W is stopped by the movable stoppers 24, so that the pieces W stand by in parallel.

When the hydraulic cylinder 30 is extended, the transferors 21 vertically pivot from the lowered position, which is shown with solid lines in FIG. 2(A), to their elevated position, which is shown with two-dot broken lines in FIG. 2(A). The inclined supporting surfaces 25 of the upward pivoting transferors 21 raise only the first workpiece W supported in parallel with the others on the supporting rails 12b. The upper ends of the supporting surfaces 25 of the transferors 21 at their elevated position are positioned higher than the tops of the movable stoppers 24. The workpiece W raised by the transferors 21 rolls down under gravity on the support surfaces 25 until it is stopped by the movable positioners 35.

Then, when the hydraulic cylinder 30 retracts to return the transferors 21 to their lower position, the workpiece W moves down between the fixed rollers 33 and the movable positioners 35 until it rests on the horizontal rollers 15 (shown by two-dot broken lines). As a result, the workpiece W is fed to the conveying path 13.

Figure 3:
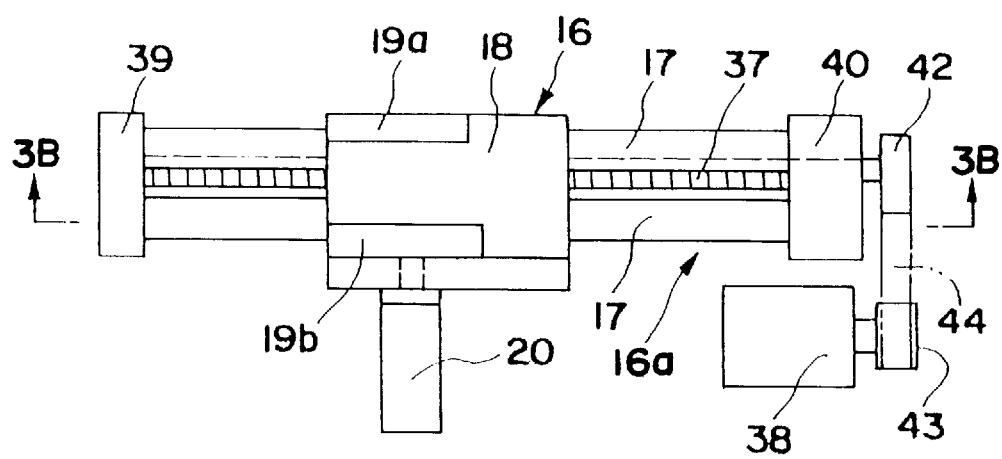
FIG. 3(A) is an enlarged top plan view showing the means for the driving the carriage of the work carrying vise of the cutting apparatus.
FIG. 3(B) is a cross-sectional view taken along line V—V of FIG. 3(A)
Figure 3:
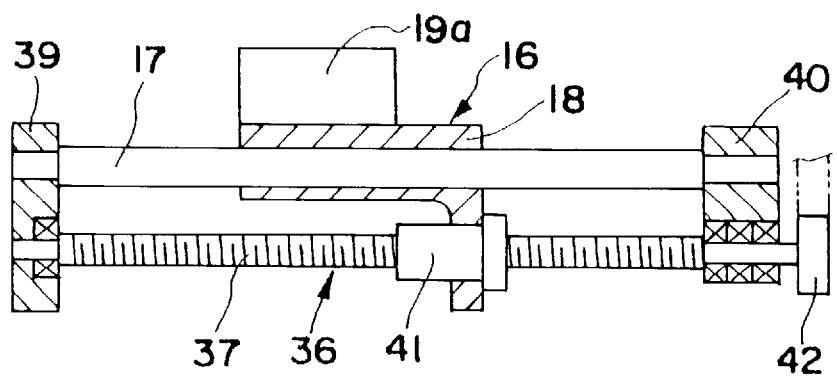
Figure 4:
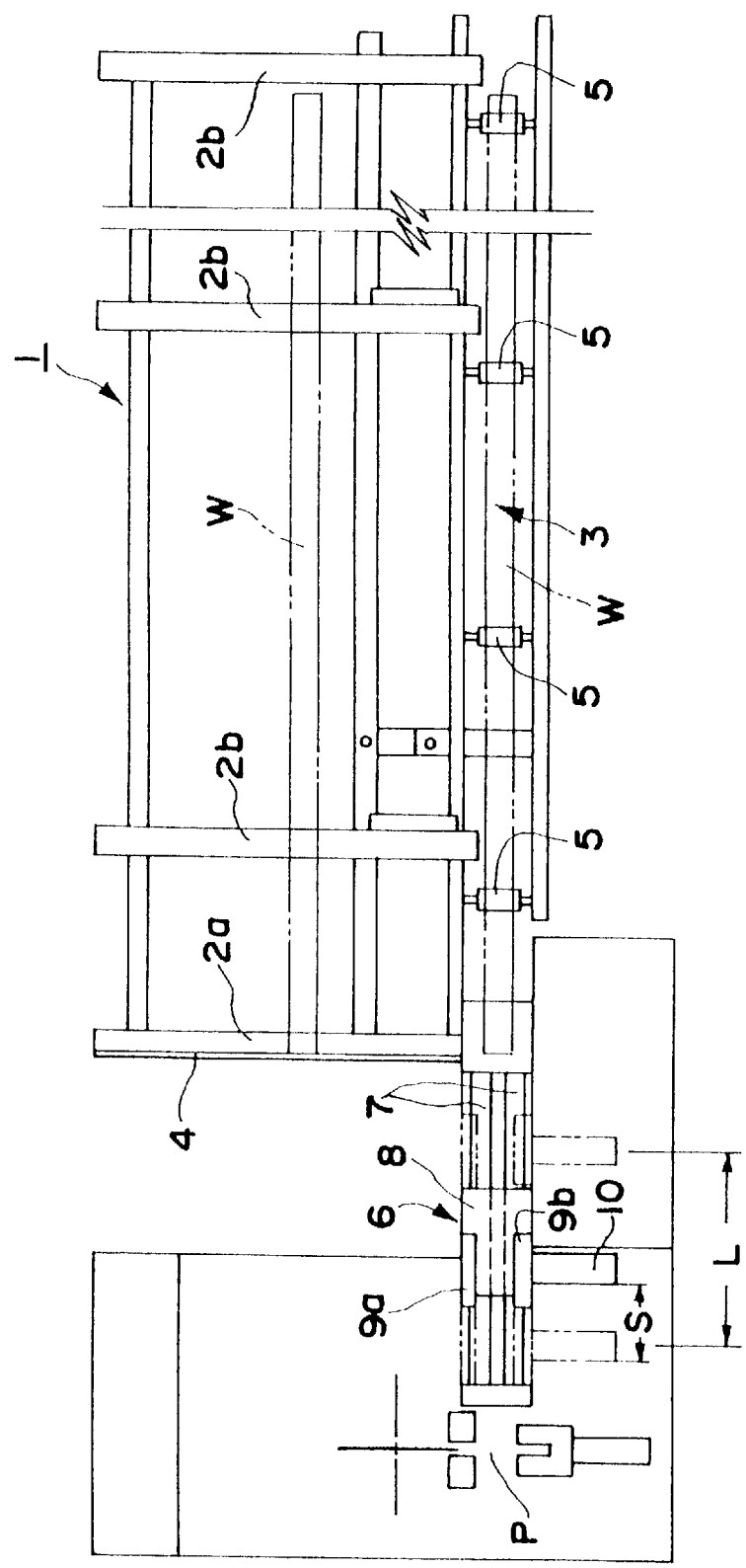
FIG. 4 is a top plan view of a prior art cutting apparatus.

FIGS. 3(A) and 3(B) show a means for driving the work carrying vise 16. This driving means includes the pair of parallel horizontal guide rods 17 for guiding the carriage 18, which can be reciprocated along the rods 17 by a screw conveyor mechanism 36. This mechanism 36 includes a screw shaft 37, which can be rotated by an electric motor 38. The guide rods 17 are attached to a front frame 39 and a rear frame 40. The screw shaft 37 is rotatably supported by the front and rear frames 39 and 40, and is engaged by a conveying nut 41, which is attached to the carriage 18. The screw shaft 37 is connected through pulleys 42 and 43 and a timing belt 44 to the motor 38. Therefore, the carriage 18 can be moved between both ends of an arbitrary stroke within the range of movement by controlling the motor 38.

The work supporting surface 18a of the carriage 18 of the work carrying vise 16 is flush with the tops of the horizontal rolls 15 of the conveying path 13. As shown in FIG. 1, a main vise mechanism 45 can hold a workpiece W in front and in the rear of the cutting position P. This main vise mechanism 45 includes a fixed vise jaw 46a, a movable vise jaw 46b, and a hydraulic cylinder 47 for driving the movable vise jaw 46b. A circular saw 48 is also shown schematically.

Initially, the work carrying vise 16 is positioned at the rear end X of its range L of movement, as shown by solid lines in FIG. 1, with the movable vise jaw 19b open. Then, the loading mechanism 11 is operated to load the first of the workpiece W standing by in parallel on the inclined supporting rails 12b into the conveying path 13. A front part of the piece W in the path 13 rests on the carriage 18 of the work carrying vise 16. The front portion of the path 13 is located within the range L of movement of the work carrying vise 16. Therefore, when a workpiece W is loaded into the path 13 by the loading mechanism 11, its front portion is placed automatically onto the work supporting surface 18a, where it can be held between the vise jaws 19a and 19b. FIG. 2(B) shows the end of the workpiece placed on the carriage surface 18a.

A workpiece W is thus loaded into the conveying path 13, and its front end is at the position where it can be held on the carrying vise mechanism 16. Thereafter, the vise jaws 19a and 19b are closed to hold the piece W. With the piece W thus held, the work carrying vise 16 is moved toward the cutting position P by the drive until it reaches the position Y in FIG. 1. When the work carrying vise 16 is located at this Y position, the front end of the piece W protrudes forward of the cutting position P. Then, a front end portion of the piece W held by the main vise mechanism 45, is cut by the saw 48 for the first time. Thereafter, opening the vises 19a and 19b of the work carrying vise 16, then the vise 16 is moved back by the stroke S that equals the length of the parts into which the piece W should be cut. The returned vise 16 stands by at the position Z in FIG. 1. After the first cut, the vise jaws 46a and 46b of the main vise 45 are opened, and then the vise jaws 19a and 19b of the carrying vise 16 are closed to hold the workpiece W. With the piece W thus held, the vise 16 is moved forward from the position Z to the position Y. Again, the vise jaws 46a and 46b of the main vise 45 are closed, and the piece W is cut for the second time by the saw 48. This operation is repeated to cut the piece W for a desired number of times.

After the first workpiece W is thus cut up, the work carrying vise 16 is moved back to the rear end X of the range L of its movement. The loading mechanism 11 is operated again the same way as explained above, loading the conveying path 13 with the next workpiece W from those standing by in parallel on the inclined supporting rails 12b. This places the front end of the second workpiece W on the carriage 18 of the work carrying vise 16. The second piece W is cut in the same manner as described above.

The inclined supporting rail 12a at the front end of the loading mechanism 11 is located within the range L of movement of the work carrying vise 16, so that the front end of the conveying path 13 is located within this range L. When a workpiece W is loaded into the work carrying path 13 by the mechanism 11, its end is placed automatically on the supporting surface 18a of the carriage 18 of the work carrying vise 16, where it is held between the vise jaws 19a and 19b. It is therefore not necessary to transfer the piece W in the path 13 onto the vise 16 by the kind of special transfer equipment as has been conventionally employed. This shortens the operation time and makes the conventional transfer equipment unnecessary.

The drive for moving the work carrying vise 16 includes the guide rods 17 for guiding the travel of the carriage 18, the screw transport mechanism 36 for reciprocating the carriage 18 along the rods 17, and the electric motor 38 for rotating the screw shaft 37 of the mechanism 36. The motor 38 can be electrically controlled, so that it is easy to select any desired stroke, the stopping position and the like of the carriage 18. In particular, the use of the screw conveying mechanism 36 makes the carriage 18 travel quickly and securely.

As a workpiece W is raised to the elevated position by the transferors 21 pivoting upwardly along their upper ends 21b, which are perpendicular to the workpieces W on the inclined supporting rails 12b. The raising force of the transferors 21 acts perpendicularly to the bottom of the piece W while the transferors 21 are moving upward. Therefore, the piece W cannot be longitudinally dislocated, and is necessarily transferred to a fixed position in the work conveying path 13.

The movable positioner 35 has to be adjusted to the workpiece diameter. The reference positions of the movable stoppers 24 and movable positioners 35 are now defined by their proper positions for a given workpiece diameter. The difference between such given diameter and the diameter of particular workpieces W which should be cut is nearly equal to the horizontal distance by which these stoppers 24 and positioners 35 should be shifted for the particular pieces from their respective reference positions, that is, the length of movement toward the lower ends of the rails 12b for the diameter increase, and toward the upper ends for the diameter decrease. According to this embodiment, each movable stopper 24 and the associated movable positioner 35 are integrally mounted. It is therefore possible to position the stopper 24 and positioner 35 at the same time by shifting only the stopper. Furthermore, it is easy to make, mount and handle the movable stoppers 24 and positioners 35 together in this manner.

Each movable stopper 24 and the associated movable positioner 35 protrude integrally from a long plate 34 slidably supported on one side of an inclined supporting rail 12b. It is therefore possible to form a movable stopper 24 and a movable positioner 35 from a single plate so that it is very easy to make and to handle them.

What is claimed is:

1. A cutting machine for cutting elongated workpieces, which comprises a work loading mechanism having
   (a) a plurality of inclined, parallel supporting rails for supporting a plurality of elongated workpieces each having a longitudinal axis and each of said supporting rails inclining toward a work conveying path for longitudinally carrying workpieces seriatim toward the front end of said work conveying path to a cutting position, said workpieces standing by on said supporting rails parallel to each other and with their longitudinal axes perpendicularly to said supporting rails,
   (b) each of said supporting rails having
      (i) a movable stopper thereon for stopping a first workpiece supported on said rails,
      (ii) a movable positioner each located opposite to a movable stopper,
      (iii) a work carrying reciprocating drive including a vise,
      (iv) a carriage and a drive motor for reciprocating along said work conveying path to move said workpieces toward the front end of said work carrying path, and
      (v) a work transferor for lifting the next workpiece to be cut over a fixed stopper and for transferring said workpiece to said conveying path, and means for lifting and lowering said work transferor with respect to an associated supporting rail perpendicularly to workpieces supported on said rails
   the supporting rail closest to the front of the work carrying path being disposed within the range of said reciprocation.

2. The cutting machine of claim 1, wherein said carriage has a top surface, the machine further including a plurality of horizontal rollers disposed along said work conveying path for supporting a workpiece for longitudinal movement along said path, the tops of said rollers being disposed flush with the top surface of the carriage.

3. The cutting machine of claim 1, wherein said reciprocating drive further comprises a horizontal guide rod for guiding the path of travel of said carriage, a screw conveyor for reciprocating said carriage along said guide rod, wherein said motor is an electric motor for moving said carriage along said screw conveyor.

4. The cutting machine of claim 1, wherein each of said supporting rails has a movable stopper thereon for stopping a first workpiece supported on said rails, and a movable positioner each located opposite to a movable stopper.

5. The cutting machine of claim 4, wherein said movable stopper and said movable positioner each are integral with each other.

6. The cutting machine of claim 5, further comprising a long plate longitudinally slidable with respect to one of said supporting rails said movable stopper and said movable positioner protruding upwardly from said plate.

* * * * *